(12) United States Patent
Terry et al.

(10) Patent No.: US 6,247,630 B1
(45) Date of Patent: Jun. 19, 2001

(54) APPARATUS AND METHOD FOR UNIFORMLY MELTING THE SOLDER ATTACHING A SURFACE MOUNT DEVICE TO A PRINTED CIRCUIT BOARD

(75) Inventors: Lance Terry, Fremont; Camnhung Tran, Sunnyvale; Michael Cilia, Fremont, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/982,227

(22) Filed: Dec. 17, 1997

(51) Int. Cl.[7] .............................. B23K 1/00; B23K 31/00; B23K 1/018
(52) U.S. Cl. ..................... 228/20.1; 228/42; 228/119; 228/191; 228/234.1; 228/264
(58) Field of Search ................ 228/42, 6.2, 234.1, 228/191, 264, 119

(56) References Cited

U.S. PATENT DOCUMENTS

| | | | |
|---|---|---|---|
| 4,444,559 | * | 4/1984 | Schink et al. ................ 432/226 |
| 4,564,135 | * | 1/1986 | Barresi et al. ................ 228/6.2 |
| 4,767,047 | * | 8/1988 | Todd et al. ................ 228/6.2 |
| 4,799,617 | * | 1/1989 | Friedman ................ 228/180.2 |
| 4,805,827 | * | 2/1989 | Coffman et al. ................ 228/20 |
| 4,952,778 | * | 8/1990 | Zimmer ................ 219/243 |
| 4,957,139 | * | 9/1990 | Gwin et al. ................ 137/556 |
| 5,196,667 | * | 3/1993 | Gammelin ................ 219/85.12 |
| 5,263,620 | * | 11/1993 | Hernandez et al. ................ 225/1 |
| 5,419,481 | * | 5/1995 | Lasto et al. ................ 228/6.2 |
| 5,814,789 | * | 9/1998 | O'Leary et al. ................ 219/388 |

OTHER PUBLICATIONS

Product manual, "Freedom 2000 Rework Station", Conceptronic, Inc., Nov. 1994.*

* cited by examiner

Primary Examiner—Patrick Ryan
Assistant Examiner—Kiley Stoner
(74) Attorney, Agent, or Firm—Pennie & Edmonds LLP

(57) ABSTRACT

A flow control nozzle for hot gases includes an input end to receive a hot gas. An output end of the flow control nozzle delivers the hot gas to a surface mount device attached with solder to a printed circuit board. A gas distribution mechanism is positioned between the input end and the output end. A gas flow control mechanism is positioned in the gas distribution mechanism to selectively alter the flow of the hot gas through the gas distribution mechanism such that the gas distribution mechanism and the gas flow control mechanism operate to deliver the hot gas to the output end in a substantially uniform manner that facilitates substantially uniform melting of the solder.

14 Claims, 4 Drawing Sheets

APPARATUS AND METHOD FOR UNIFORMLY MELTING THE SOLDER ATTACHING A SURFACE MOUNT DEVICE TO A PRINTED CIRCUIT BOARD

BRIEF DESCRIPTION OF THE INVENTION

This invention relates generally to the mounting and removal of electronic components from a printed circuit board. More particularly, this invention relates to a technique for uniformly melting the solder attaching a surface mount device to a printed circuit board.

BACKGROUND OF THE INVENTION

Most electronic systems include a printed circuit board with several surface mount devices connected to the printed circuit board. As used herein, the term surface mount device includes connectors and semiconductor packages. Frequently, the surface mount devices are connected to the printed circuit board through the use of solder. Sometimes it is necessary to remove and replace a surface mount device. When removing a surface mount device, it is necessary to melt the solder and then lift the device from the printed circuit board. When replacing a surface mount device, it is, necessary to uniformly melt the solder that is used to attach the device.

Problems arise in the prior art when melting the solder associated with a surface mount device. The problem arises because existing flow control nozzles do not uniformly distribute a hot gas stream. This is a particular problem in the case of long (e.g., 4 inches) surface mount devices. As a result, the solder melts unevenly. Consequently, solder that is not completely melted will produce greater resistance when lifting the surface mount device from the printed circuit board. This can result in damage to the surface mount device and printed circuit board. Another problem is that the surface mount device may become damaged if it is exposed to excessive heat while waiting for the solder at another part of the surface mount device to melt.

In view of the foregoing, there is a need for an improved technique of melting solder associated with surface mount devices positioned on a printed circuit board. The improved technique should provide relatively uniform gas distribution to facilitate substantially uniform melting of the solder. This will allow a surface mount device to be lifted from a printed circuit board or re-soldered to a printed circuit board with minimal damage.

SUMMARY OF THE INVENTION

A flow control nozzle for hot gases includes an input end to receive a hot gas. An output end of the flow control nozzle delivers the hot gas to a surface mount device connected with solder to a printed circuit board. A gas distribution mechanism is positioned between the input end and the output end. A gas flow control mechanism is positioned in the gas distribution mechanism to selectively alter the flow of the hot gas through the gas distribution mechanism such that the gas distribution mechanism and the gas flow control mechanism operate to deliver the hot gas to the output end in a substantially uniform manner that facilitates substantially uniform melting of the solder.

The gas flow control mechanism of the invention is relatively easy to fabricate. Despite its relatively simple structure, the gas flow control mechanism provides refined flow control. As a result, solder is melted relatively uniformly, thereby allowing removal and replacement of surface mount devices.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
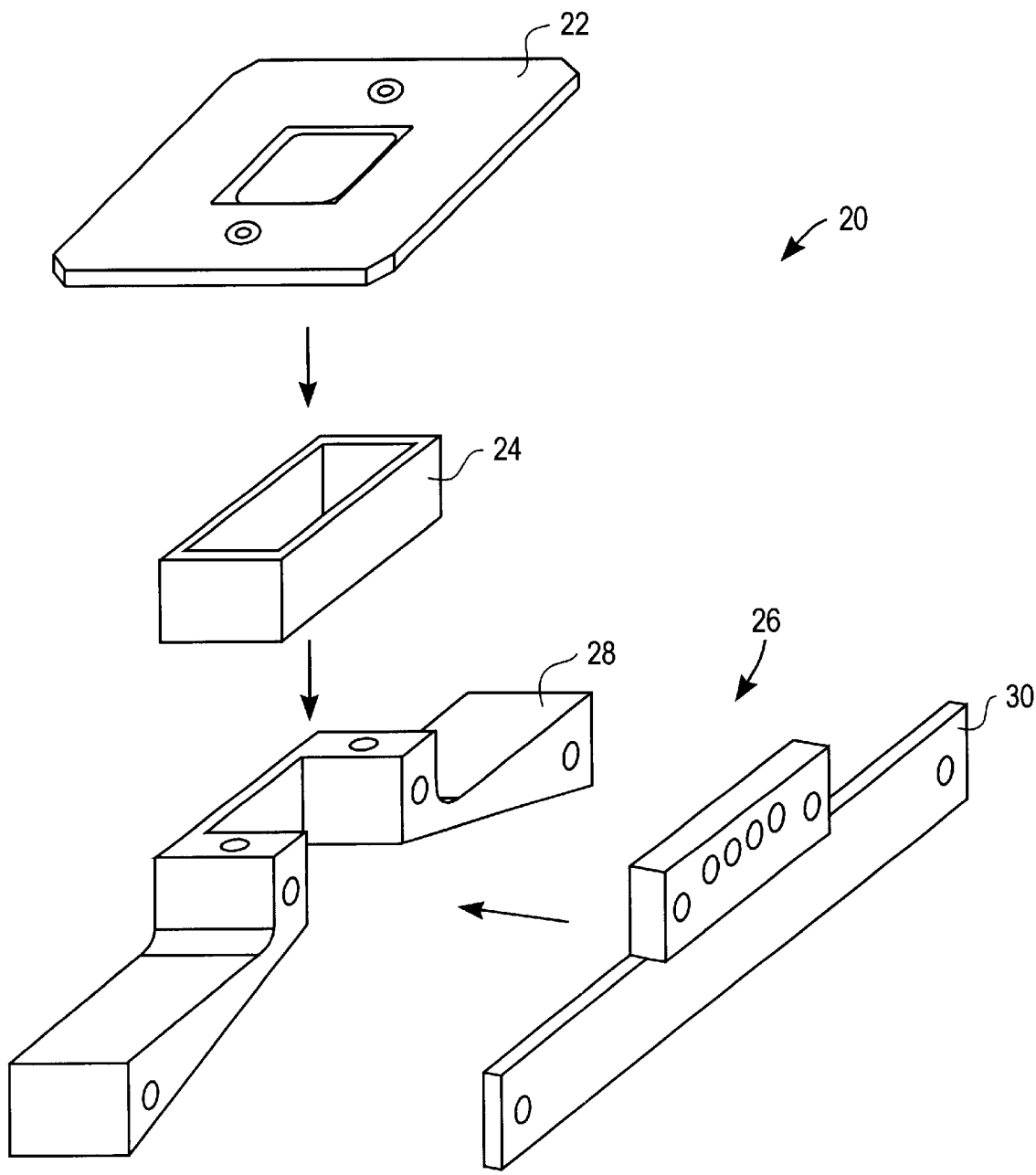
FIG. 1 is an exploded view of a flow control nozzle in accordance with an embodiment of the invention.

FIG. 1 is an exploded view of a flow control nozzle 20 constructed in accordance with an embodiment of the invention. The flow control nozzle 20 includes a connector plate 22 for attachment to a desoldering machine (not shown in FIG. 1). The flow control nozzle 20 may be constructed with a transition channel 24. The flow control nozzle 20 also includes a distributor 26, for example constructed with a distributor body 28 and a distributor plate 30.

Figure 2:
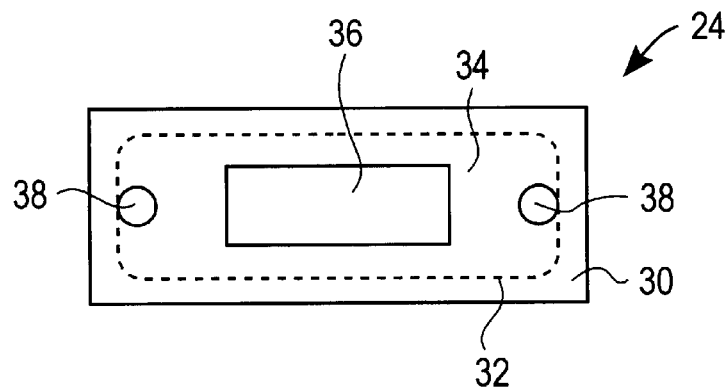
FIG. 2 is a top view of a transition channel used in an embodiment of the flow control nozzle of the invention.

FIG. 2 is a top view of the transition channel 24. The transition channel 24 includes a channel body 30 defining a channel aperture 32. There is a channel body floor 34 at the base of the channel aperture 32. The channel body floor 34 defines a channel flow aperture 36. Channel connection apertures 38 are preferably provided so that the transition channel can be fastened with screws or an equivalent structure to the distributor body 28.

Figure 3:
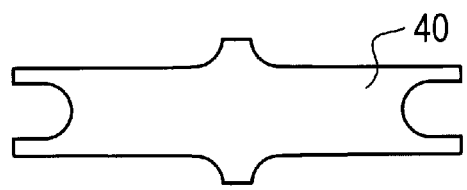
FIG. 3 is a top view of a transition channel deflector plate used in the transition channel of FIG. 2.
Figure 4:
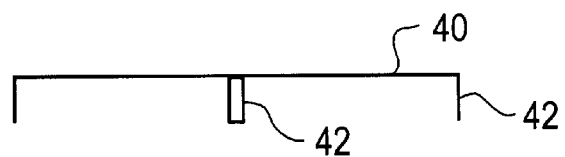
FIG. 4 is a side view of the transition channel deflector plate of FIG. 3.

FIG. 3 illustrates a transition channel deflector plate 40, which is preferably positioned on the channel body floor 34. FIG. 4 is a side view of the transition channel deflector plate 40, showing deflector plate legs 42. As its name implies, the transition channel deflector plate 40 operates to deflect an incoming stream of hot gas to facilitate a more even distribution of hot gas as it passes through the channel flow aperture 36.

In sum, a hot gas stream passes through the connector plate 22 and into the transition channel 24. The transition channel deflector plate 40 deflects the hot gas stream in such a manner that it more uniformly passes through the channel flow aperture 36 on route to the distributor 26.

Figure 5:
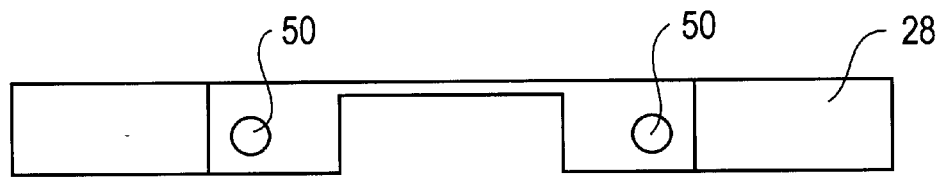
FIG. 5 is a top view of a distributor body in accordance with an embodiment of the invention.

FIG. 5 is a top view of the distributor body 28. The figure illustrates distributor body vertical connection apertures 50, which are positionally aligned with the channel connection apertures 38, allowing a fastening device, such as a screw or an equivalent device, to fixedly connect the respective components.

Figure 6:
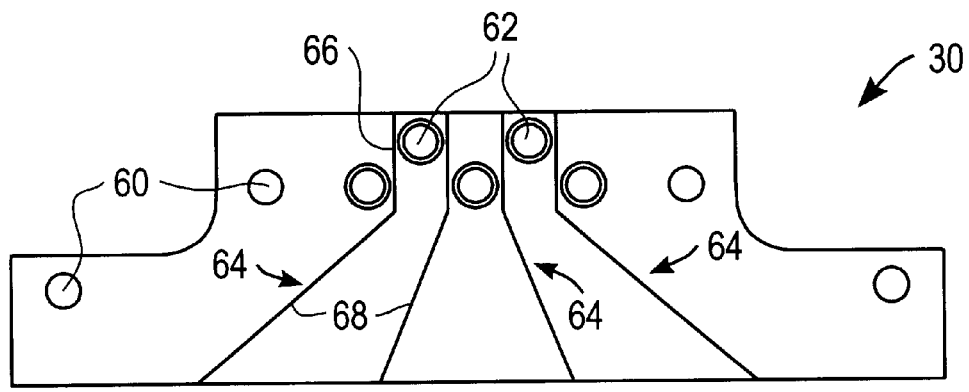
FIG. 6 is a side view of a distributor plate in accordance with an embodiment of the invention.

FIG. 6 is a side view of the distributor plate 30. The figure illustrates the side of the distributor plate 30 that is attached to the distributor body 28, thus this view of the distributor plate 30 is obstructed from sight in FIG. 1. The distributor plate 30 includes distributor plate connection apertures 60, which are aligned with corresponding apertures on the distributor body 28, allowing the two structures to be fixedly attached by screws or an equivalent fastening structure.

FIG. 6 also illustrates distributor plate obstruction member apertures 62. The apertures 62 receive adjustable obstruction members that are used to control the flow of hot gas through the distributor 26, as discussed further below.

The distributor plate 30 also includes a set of distributor plate channel walls 64. The channel walls are used to form channels, which define paths for the hot gas flow. The channel walls 64 include a straight channel wall region 66 and a flared channel wall region 68.

Figure 7:
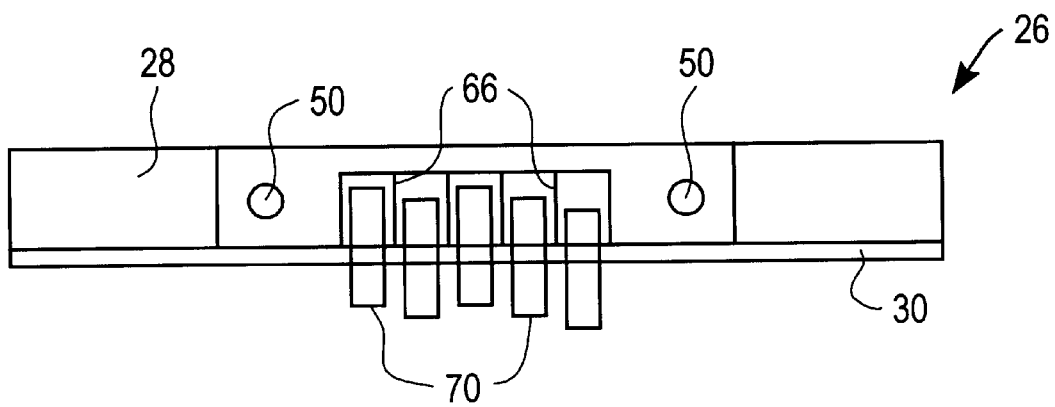
FIG. 7 is a top view of an assembled distributor body and distributor plate in accordance with an embodiment of the invention.

FIG. 7 is a top view of the distributor 26. The figure illustrates the distributor body 28 connected to the distributor plate 30. The figure also shows the straight channel wall region 66 of the distributor plate channel walls. Within each channel is a controllable flow path obstruction member 70. The controllable flow path obstruction members 70 are positioned in the distributor plate obstruction member apertures 62. Preferably, each controllable flow path obstruction member 70 is implemented as a threaded peg or screw. This allows the obstruction member 70 to be easily adjusted by hand or with a screw driver. That is, the position of the obstruction member in the channel is adjusted for a desired flow distribution. More particularly, each obstruction member 70 is moved in and out of the channel to achieve a desired flow distribution. For example, by positioning an obstruction member 70 deep into the channel, the obstruction member 70 will force hot gas to be deflected to other channels. Conversely, if the obstruction member 70 is substantially removed from the channel, then more hot gas will flow through the channel. In this way, the temperature distribution at the output of the flow control nozzle 20 is adjusted to achieve a substantially uniform profile. This substantially uniform profile is achieved without complex mechanical designs or sophisticated changes to the electronics of the desoldering machine 80.

Figure 8:
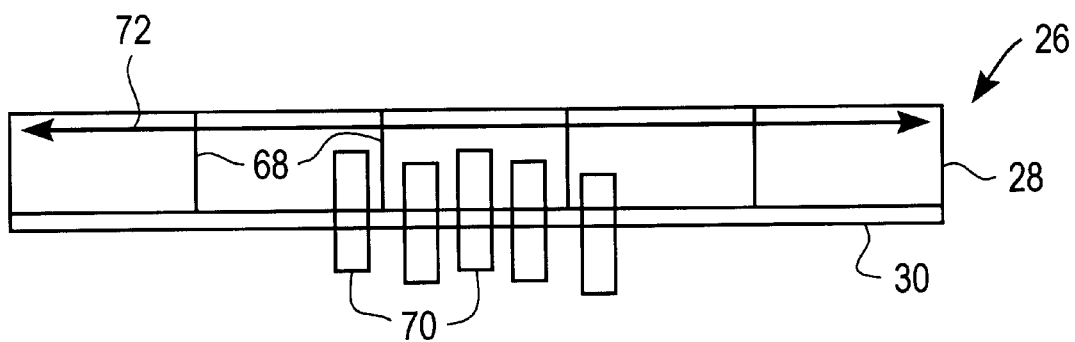
FIG. 8 is a bottom view of an assembled distributor body and distributor plate in accordance with an embodiment of the invention.

FIG. 8 is a bottom view of the distributor 26. The figure shows the flared channel wall regions 68 of the distributor plate channel walls. Observe that at the output end of the distributor, the flared channel wall regions 68 divide the exit path 72 into relatively even segments. FIG. 8 also illustrates the obstruction members 70 at various positions to achieve a desirable flow profile. FIG. 8 is simplified to the extent that it does not illustrate how the distributor plate channel walls 64 have a straight wall region 66 and a flared channel wall region 68, this feature is fully appreciated with reference to FIG. 6.

Those skilled in the art will appreciate that the apparatus of the invention is particularly useful when used in relation to long surface mount devices. In such cases, the input gas stream must be uniformly distributed over a relatively long path. In other words, an input gas stream with a relatively small cross-sectional area must be uniformly distributed over a relatively large cross-sectional area.

Figure 9:
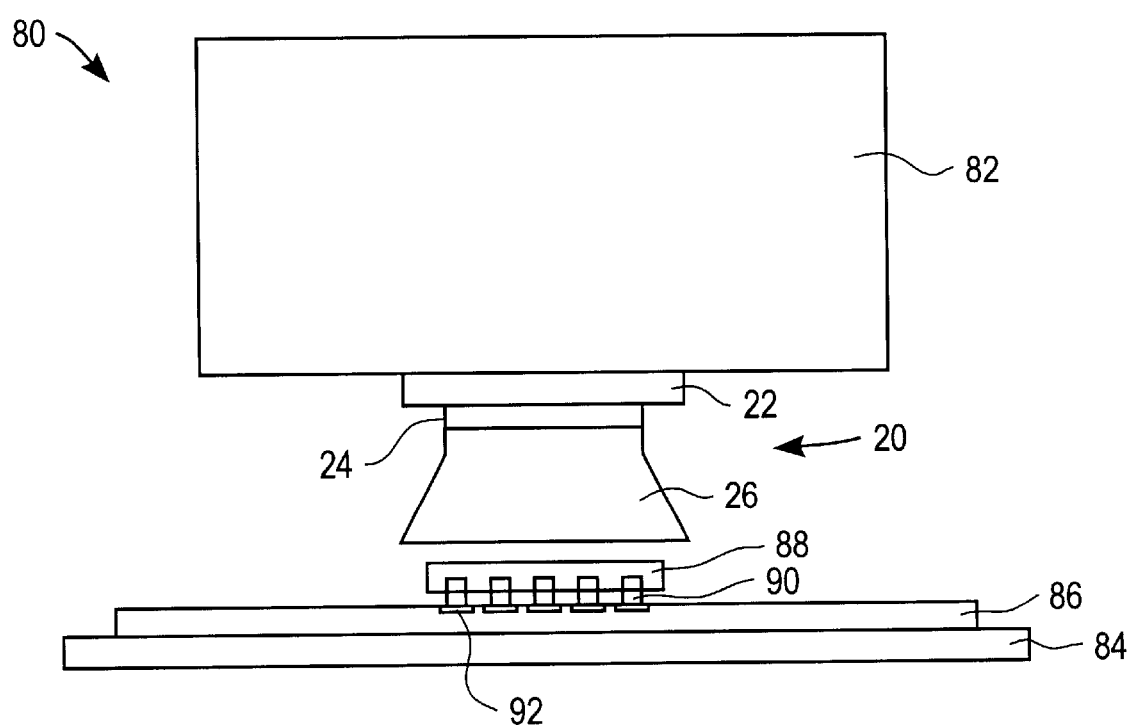
FIG. 9 is a desoldering machine incorporating the flow control nozzle of the invention.

FIG. 9 illustrates a desoldering machine 80. The desoldering machine 80 includes a control module 82 which generates a hot gas stream. The desoldering machine 80 also includes a printed circuit board positioning apparatus 84. A printed circuit board 86 is placed on the printed circuit board positioning apparatus 84. The printed circuit board 86 includes at least one surface mount device 88. In this case, the surface mount device is in the form of a semiconductor package, which includes package pins 90. FIG. 9 illustrates solder 92, which attaches the semiconductor package 88 to the printed circuit board 86.

Desoldering machines are known in the art. The flow control nozzle 20 of the invention can be used in connection with prior art desoldering machines. FIG. 9 illustrates the flow control nozzle 20, including the connector plate 22, transition channel 24, and distributor 26.

The printed circuit board positioning apparatus 84 is used to position the printed circuit board 86 such that the surface mount device 88 is adjacent to the flow control nozzle 20. More particularly, the package pins 90 on one side of the surface mount device 88 are positioned adjacent to the flow control nozzle 20. The hot gas stream is forced through the flow control nozzle in the manner previously described. As a result, the solder 92 associated with the package pins 90 is melted in a substantially uniform manner. The invention typically achieves substantially uniform heat distribution at the exit path 72 of the nozzle 20, such that the hot gas does not vary more than 5° C. at the exit path 72. As a result, the package pins 90 experience substantially uniform resistance from the solder as the device 88 is completely or partially lifted from the printed circuit board 86. As a result, damage to the device 88 and printed circuit board 86 is avoided. Similarly, when re-mounting a surface mount device 88, the solder experiences substantially uniform heat and therefore melts in a substantially uniform manner. As a result, one portion of the device 88 is not exposed to excessive heat while waiting for all regions of the solder to melt.

As known in the art, solder melts at approximately 183° C. The invention is useful in obtaining a relatively uniform flow output at the exit path of the nozzle. This result has been achieved in relatively long exit paths, for example with a cross-sectional area of a quarter inch by four inches. As indicated above, the flow output is typically within at least 5° C. at the exit path 72. The invention typically achieves a uniform flow distribution such that there is no more than a 10% temperature differential at the exit path, more typically, the temperature differential at the exit path is less than 5%.

If desired, the invention can be used to effectively cut-off selected channels and therefore concentrate the hot gas stream on a smaller segment of a semiconductor package.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A flow control nozzle for hot gases, comprising:
   an input end to receive a hot gas;
   an output end to deliver said hot gas to a surface mount device connected with solder to a printed circuit board;
   a gas distribution mechanism positioned between said input end and said output end, said gas distribution mechanism comprising a plurality of channels; and
   a gas flow control mechanism positioned in said gas distribution mechanism, said gas flow control mechanism including a plurality of controllable flow path obstruction members positioned in said plurality of channels to selectively alter the flow of said hot gas through said gas distribution mechanism such that said gas distribution mechanism and said gas flow control mechanism operate to deliver said hot gas to said output end in a substantially uniform manner that facilitates substantially uniform melting of said solder.

2. The apparatus of claim 1 wherein said controllable flow path obstruction members are threaded pegs.

3. The apparatus of claim 1 further comprising a transition channel connected between said input end and said gas distribution mechanism.

4. The apparatus of claim 3 further comprising a transition channel deflector plate.

5. The apparatus of claim 1 wherein said gas distribution mechanism includes:
   a distributor body; and
   a distributor plate connected to said distributor body.

6. The apparatus of claim 5 wherein said distributor plate includes a set of apertures to receive said gas flow control mechanism.

7. The apparatus of claim 1 wherein said output end has an exit path, said gas distribution mechanism and said gas flow control mechanism delivering said hot gas to said output end such that the temperature of said hot gas does not vary more than 5° C. at said exit path.

8. A desoldering machine, comprising:
   a control module to generate a stream of hot gas;
   a printed circuit board positioning apparatus to selectively position a printed circuit board with a surface mount device connected thereto with solder; and
   a flow control nozzle connected to said control module, said flow control nozzle including:
      an input end to receive said stream of hot gas from said control module,
      an output end to deliver said stream of hot gas to said surface mount device,
      a gas distribution mechanism positioned between said input end and said output end, said gas distribution mechanism including a plurality of channels, and
      a gas flow control mechanism positioned in said gas distribution mechanism, said gas flow control mechanism including a plurality of controllable flow path obstruction members positioned in said plurality of channels to selectively alter the flow of said stream of hot gas through said gas distribution mechanism such that said gas distribution mechanism and said gas flow control mechanism operate to deliver said stream of hot gas to said output end in a substantially uniform manner that facilitates substantially uniform melting of said solder.

9. The apparatus of claim 8 wherein said controllable flow path obstruction members are threaded pegs.

10. The apparatus of claim 8 further comprising a transition channel connected between said input end and said gas distribution mechanism.

11. The apparatus of claim 10 further comprising a transition channel deflector plate.

12. The apparatus of claim 8 wherein said gas distribution mechanism includes:
    a distributor body; and
    a distributor plate connected to said distributor body.

13. The apparatus of claim 12 wherein said distributor plate includes a set of apertures to receive said gas flow control mechanism.

14. The apparatus of claim 8 wherein said output end has an exit path, said gas distribution mechanism and said gas flow control mechanism delivering said hot gas to said output end such that the temperature of said hot gas does not vary more than 5° C. at said exit path.

* * * * *